United States Patent
Reddy et al.

(10) Patent No.: US 12,204,628 B2
(45) Date of Patent: Jan. 21, 2025

(54) MANAGEMENT CONTROLLER-BASED VERIFICATION OF PLATFORM CERTIFICATES

(71) Applicant: HEWLETT PACKARD ENTERPRISE DEVELOPMENT LP, Houston, TX (US)

(72) Inventors: Dilip Kumar Ramakrishna Reddy, Karnataka (IN); Kenneth J. Geer, Roseville, CA (US); Shiva R. Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 479 days.

(21) Appl. No.: 17/660,437

(22) Filed: Apr. 25, 2022

(65) Prior Publication Data

US 2023/0342446 A1 Oct. 26, 2023

(51) Int. Cl.
| | | |
|---|---|---|
| *G06F 21/64* | (2013.01) | |
| *G06F 21/33* | (2013.01) | |
| *G06F 21/57* | (2013.01) | |
| *G06F 21/60* | (2013.01) | |
| G06F 21/10 | (2013.01) | |

(52) U.S. Cl.
CPC ............ *G06F 21/33* (2013.01); *G06F 21/572* (2013.01); *G06F 21/602* (2013.01); *G06F 21/64* (2013.01); *G06F 21/107* (2023.08)

(58) Field of Classification Search
CPC ...... G06F 21/33; G06F 21/572; G06F 21/602; G06F 21/64; G06F 21/107; G06F 21/57; G06F 21/575
See application file for complete search history.

(56) References Cited

U.S. PATENT DOCUMENTS

| | | |
|---|---|---|
| 2020/0099536 A1 | 3/2020 | Block et al. |
| 2021/0073003 A1 | 3/2021 | Jacquin et al. |

OTHER PUBLICATIONS

Dasari, Satvik; "Aegis: A Framework to Detect Compromised Components in the Supply Chain of Information Technology Infrastructure"; IEEE Explore, 978-1-7281-9098-3/20/2020; downloaded on Nov. 23, 2021 for limited use to Hewlett Packard; 6 pp.
Trusted Computing Group; Specification, TCG PC Client Platform Firmware Integrity Measurement; Version 1.0 Revision 43, Family 2.0, May 7, 2021; 21 pp.

*Primary Examiner* — Brian F Shaw
(74) *Attorney, Agent, or Firm* — Trop, Pruner & Hu, P.C.

(57) ABSTRACT

A process includes accessing by a management controller of a computer platform, a platform certificate that is stored in a secure memory. The platform certificate includes data representing a reference inventory for the computer platform. The platform certificate includes data representing information designated to bind the platform certificate to a security processor. The security processor is accessible by the management controller. The security processor is inaccessible by an operating system of the computer platform. The process includes verifying the platform certificate. Verifying the platform certificate includes validating, by the management controller, a signature of the platform certificate; and validating, by the management controller, the information designated to bind the platform certificate to the security processor. Verifying the platform certificate includes comparing, by the management controller, a second inventory of the computer platform to the reference inventory.

17 Claims, 7 Drawing Sheets

MANAGEMENT CONTROLLER-BASED VERIFICATION OF PLATFORM CERTIFICATES

BACKGROUND

A computer platform may be subject to a security attack in which a rogue entity seeks to access information that is stored on the computer platform or harm components of the computer platform. For purposes of preventing security attacks or at least inhibiting the degree of potential harm inflicted by security attacks, the computer platform may have different levels of protection. For example, the computer platform may have various mechanisms to limit access, such as firewalls, passwords, keys, and so forth. As another example, the computer platform may have a secure cryptographic processor (e.g., a trusted platform module (TPM)), which may provide a number of security-related features for the computer platform. The security-related features may, for example, be used to ensure that the computer platform consistently behaves in expected ways and prove that the computer platform is trustworthy.

DETAILED DESCRIPTION

Figure 1:
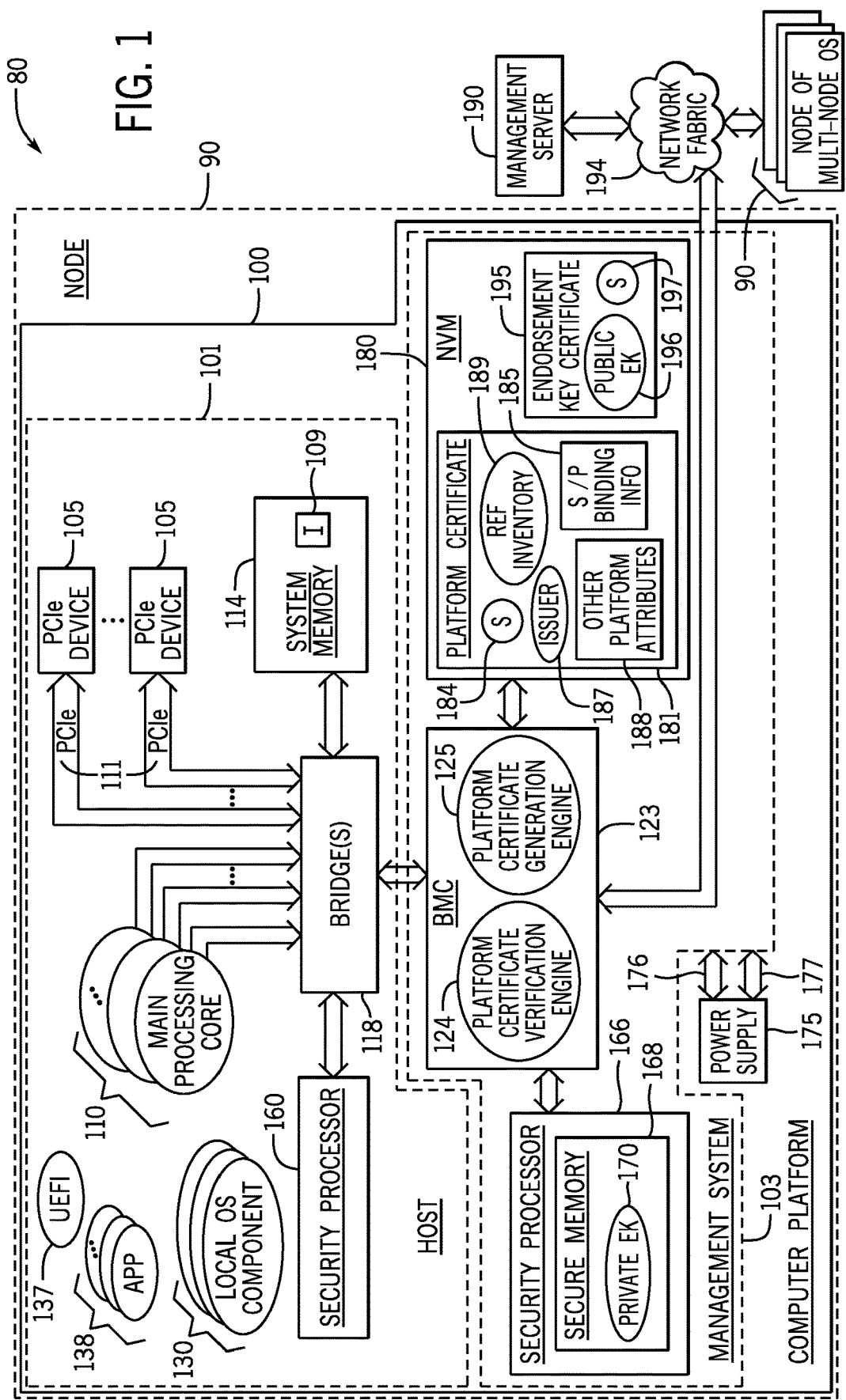
FIG. 1 is a schematic diagram of a computer platform having a baseboard management controller (BMC) that verifies a platform certificate according to an example implementation.

A secure cryptographic processor (herein called a "security processor") for a computer platform may provide trusted computing operations for the computer platform for purposes of ensuring that the computer platform consistently behaves in expected ways. As examples of trusted computing operations, the security processor may generate cryptographic keys; store security artifacts (e.g., cryptographic keys and certificates); access security artifacts; erase security artifacts; store integrity measurement digests; provide signed integrity measurement digests for remote attestation; encrypt data; decrypt data; seal cryptographic keys to certain integrity measurement digest states (e.g., bind a key encrypting key of a storage device to a set of integrity measurements); unseal cryptographic keys; provide nonces for cryptographic communications; sign certificates; provide random or pseudorandom numbers; and so forth. A trusted platform module, or "TPM," is an example of a security processor.

A manufacturer of a computer platform may create a digital certificate, called a "platform certificate," for the computer platform and store the platform certificate in a memory of the computer platform. The platform certificate, in general, attests to certain attributes (also called the "attested attributes" herein) of the computer platform. The attributes may include attributes that address the computer platform as a whole (e.g., a platform model number, a platform serial number, a platform serial number, a specification that corresponds to the platform, and so forth). The attributes may include attributes that identify specific configuration elements of the computer platform, such as specific hardware and/or software components. Moreover, the attributes may identify, or reference, a specific security processor for the computer platform such that the platform certificate is bound to the specific security processor. A platform certificate verification component of the computer platform may, at the startup of the computer platform (e.g., at power up or reset of the computer platform), verify the platform certificate for purposes of ensuring that the computer platform has not been altered, i.e., for purposes of ensuring that the actual attributes of the computer platform are the same as the attested attributes. Unauthorized alteration of a computer platform may occur, for example, in the supply chain from the factory or at the customer's site. In this context, "verifying a platform certificate" generally refers to a process that includes establishing that a platform certificate is to be trusted and includes determining that the attributes to which the platform certificate attests are accurate, or correct.

The information of a platform certificate, which binds the platform certificate to a specific security processor may be in the form of a reference to a digital certificate called an "endorsement key certificate," or "EK certificate," herein. The EK certificate may contain data that represents identifying attributes of a specific security processor, such as attributes representing a manufacturer of the security processor, a model of the security processor, a version of the security processor, a serial number of the security processor, a unique identifier of the security processor, and so forth. Moreover, the EK certificate may contain data that represents the public part (called the "public EK" herein) of an asymmetric cryptographic key (or "EK"), such as a Rivest-Sharmir-Adleman (RSA) key. The private part (called the "private EK" herein) of the EK is stored inside the security processor, is unique to that security processor, and is not exposed outside of the security processor. The use of the private EK may be constrained solely to decryption, and as such, the private EK may not be used for example, to produce, digital signatures. The security processor may use the EK for decryption operations to, for example, provide for authentication of the security processor and prove (e.g., via credentials activation) that another key (e.g., an attestation identity key (AIK)) is stored on the same security processor that stores the private EK.

The verification of the platform certificate may include first validating a signature of the platform certificate. In the context used herein, "validating a signature of a certificate" refers to a process that determines whether the certificate is to be trusted, i.e., a process resulting in either a determination that the certificate signature passes validation (and the certificate is therefore to be trusted) or a determination that the certificate signature fails validation (and the certificate is not be trusted). The validation of the platform certificate signature may include evaluating a signature of the platform certificate based on the content of the platform certificate. In this manner, an issuer of the platform certificate may sign the platform certificate based on the content of the platform certificate. The platform certificate contains a field with data that represents the issuer's signature, and the platform certificate contains a field with data that identifies the issuer certificate. The issuer may, for example, generate the signature based on a private key of the issuer and information that is contained in the non-signature fields of the platform certificate. The corresponding public key of the issuer may be used to validate the signature of the platform certificate. More specifically, the platform certificate and the certificate of the issuer may be part of a certificate chain of trust of a public key infrastructure (PKI). The certificate chain of trust begins with a root certificate authority (CA) certificate (or "root certificate"); includes zero, one or multiple intermediate certificates; and ends with the platform certificate. The validation of the platform certificate signature by the verification component may involve the verification component validating the signatures of the certificate chain of trust that corresponds to the platform certificate.

As part of the verification of the platform certificate, the verification component may validate the signature of the EK certificate that is referenced by the platform certificate for purposes of determining whether the EK certificate is to be trusted. This validation may involve the verification component validating the signatures of the certificate chain of trust that corresponds to the EK certificate.

Assuming that the validations of the signatures of the platform certificate and the EK certificate pass so that the platform certificate and the EK certificate may be trusted, the verification component may then proceed with verifying attributes of the computer platform to which the platform certificate attests. This verification may include verifying attested platform identifying attributes and verifying attested computer inventory attributes for purposes of determining whether the actual attributes of the computer platform match the attested attributes. If the verification component reveals that the actual attributes of the computer platform differ from the attested attributes, then the verification fails, and computer platform may be considered to be compromised. One or multiple corrective actions may be undertaken responsive to detecting a compromised computer platform. As examples of such corrective actions, the computer platform may be powered down, the computer platform may be isolated from a network, the computer platform may be prevented from joining a fleet in a data center, and so forth.

In one approach, an operating system of the computer platform may serve as the above-described verification component to verify the platform certificate. Using the operating system to verify a platform certificate of a computer platform may, however, expose a customer's infrastructure (e.g., a network, other computer platforms, and so forth) to a compromised computer platform. Moreover, using an operating system to verify a platform certificate of a computer platform may constrain the customer's flexibility to adapt the computer platform to different multi-node use cases. For example, the computer platform may be a node of a group of nodes (e.g., group of computer platforms) that collectively execute a distributed, or multi-node, operating system. For a multi-node operating system, each node executes its own microkernel component and management components of the multi-node operating system. An operating system may be bound to a single security processor. Therefore, a multi-node operating system may be bound to a single security processor on one node of the group of nodes that collectively execute the operating system. Such binding prevents the use of a per node platform certificate and limits the customer's ability to scale, regroup, replace or swap nodes that collectively execute a multi-node operating system.

In accordance with example implementations that are described herein, a computer platform contains a security processor that is part of a management system of the computer platform. This security processor, in accordance with example implementations, is not visible to a host operating system (e.g., a multi-node or single node operating system) of the computer platform. The operating system may have access to another security processor of the computer platform, which is not part of the management system. In accordance with example implementations, a management controller (e.g., a baseboard management controller (BMC)) of the management system is constructed to verify a platform certificate, which references the security processor of the management system. As such, the management controller may validate the signature of the platform certificate; validate a signature of an EK certificate that is referenced by the platform certificate and corresponds to the security processor of the management system; and verify attributes of the computer platform to which the platform certificate attests.

In accordance with example implementations, the management controller verifies the platform certificate responsive to a startup (e.g., a power on or reset) of the computer platform before the platform's host operating system loads and boots. Therefore, in the event that the computer platform is compromised, the management controller's platform certificate verification reveals the compromised platform without exposing the host operating system to the compromised platform. Moreover, for a multi-node system that executes a multi-node operating system, the platform certificate may be specific to each node and specific to the management security processor of each node. A per node platform certificate enhances the ability to change multi-nodal use cases over time. Such use changes may include reordering nodes, regrouping nodes, replacing damaged or compromised nodes, and so forth.

Referring to FIG. 1, as a more specific example, in accordance with some implementations, a computing system 80 includes one or multiple nodes 90 that are interconnected by network fabric 194. In accordance with some implementations, a given node 90 may correspond to a computer platform 100. Moreover, in accordance with some implementations, the nodes 90 may be grouped, so that each group of nodes 90 collectively execute a multi-node, distributed operating system. In this manner, a given node 90, such as the computer platform 100, may include local host operating system components 130 that are executed on the node 90, such as an operating system microkernel and one or multiple management components to coordinate individual and collaborative operating system functions for the node 90. A system administrator may change the nodes 90 that form a given group of nodes over time. As examples, the number of nodes 90 for a given group may be increased; the number of nodes 90 for a given group may be decreased; a node 90 of a given group may fail and be replaced by another node 90; groupings of nodes 90 may be reorganized; and so forth.

In accordance with example implementations, a given node 90, such as the computer platform 100, may store a platform certificate 181 that is specific to the node 90 (and specific to the computer platform), even though the node 90 may be part of a group of nodes that collectively execute a multi-node operating system. The attributes to which the platform certificate 181 attests may be verified for purposes of determining whether the computer platform 100 is compromised. The node-specific platform certificate 181 enhances the ability to swap, regroup and replace nodes 90 that support a multi-node, distributed operating system.

The computer platform 100, in accordance with example implementations, may be a modular unit, which includes a frame, or chassis. Moreover, this modular unit may include hardware that is mounted to the chassis and is capable of executing machine-executable instructions. A blade server is an example of the computer platform 100, in accordance with an example implementation. The computer platform 100 may, however, be any of number of different platforms other than a blade server, in accordance with further implementations, such as a rack-mounted server, standalone server, a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, and so forth.

It is noted that the architecture of the computer platform 100 that is depicted in FIG. 1 is one of many possible architectures for the computer platform 100, in accordance with one of many possible implementations of the computer platform 100.

The network fabric 194 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

As depicted in FIG. 1, in accordance with example implementations, the computer platform 100 includes a host 101 and a management system 103. A "host" refers to components (e.g., one or multiple main processing cores 110 (e.g., central processing unit (CPU) cores) and a system memory 114) of the computer platform 100, which perform at least one of providing a host operating system (e.g., executing the local operating system components 130) to create an operating system environment for the computer platform 100 or providing a pre-boot environment (e.g., executing firmware instructions to provide a basic input/output system (BIOS) and/or a Unified Extensible Firmware Interface (UEFI) 137) to prepare the computer platform 100 for the operating system environment.

A "management system" refers to a part of the computer platform 100 that includes a management controller (e.g., a baseboard management controller (BMC) 123), which is separate from the host 101 and serves in one or multiple service roles for the host 101. In accordance with example implementations, the management controller may provide management services for the host 101, such as monitoring sensors; monitoring power statuses; logging events; and verifying firmware images before the images are loaded and executed by the host 101. The management controller may further include providing management functions that are controlled by a management server 190. In accordance with example implementations, the management server 190 may be located at a different geographical location than the computer platform 100; and for these example implementations, the management server 190 may remotely control management operations of the host 101 via the management controller. The management controller may communicate with the management server 190 using a management network channel that is separate from the network channels used by the host 101. As examples, the remotely-controlled management functions may include powering up and down the computer platform 100; placing the computer platform 100 in a standby power mode in which the management system 103 is powered up and the host 101 is powered down; designating a boot drive for the host 101; designating virtual media; performing recovery operations for the computer platform 100; and so forth. Moreover, in accordance with some implementations, the management system 103 may communicate with the management server 190 and provide one or multiple remotely-controlled management services while the computer platform 100 is in the standby power mode.

In accordance with example implementations, the management controller may provide one or multiple security-related roles to provide corresponding security-related services for the host 101. As examples, the security-related services may include validating firmware image(s); updating firmware images; monitoring firmware and/or software integrity measurements (e.g., operating system kernel measurements) to detect security issues; extending platform configuration register (PCR) states; and so forth.

For the example implementation that is depicted in FIG. 1, the management controller is a BMC 123 of the management system 103. The following description describes, in accordance with example implementations, actions that are taken by the BMC 123 as the management controller, including actions pertaining to the verification of the platform certificate 181 and creation of the platform certificate 181. However, in accordance with further example implementations, the management controller may be a component other than a BMC. In accordance with further example implementations, the management controller may be a platform controller, a chassis management controller, a smart I/O peripheral, a smart network interface controller (NIC), and so forth.

The BMC 123, as part of its management plane, may provide various management services for the computer platform 100, including monitoring sensors (e.g., temperature sensors, cooling fan speed sensors); monitoring operating system status; monitoring power statuses; logging computer system events; verifying a UEFI image when main processing core(s) 110 instantiate the UEFI 137; and providing management functions, which may be controlled remotely by the management server 190. Moreover, the BMC 123 may allow operations to be performed when the host 101 is powered down and before the operating system has booted; and the BMC 123 may be used to perform recovery operations after an operating system or computer system failure. In accordance with example implementations, the BMC 123 may include a network interface to communicate with the management server 190 via a management network. In accordance with further implementations, the BMC 123 may communicate with the management server 190 via passthrough communications through a PCIe device 105 of the computer platform 100. The management server 190 may communicate with the BMC 123 to perform such remote management functions, as keyboard video mouse (KVM) functions; virtual power functions (e.g., remotely activated functions to remotely set a power state, such as a power conservation state, a power on, a reset state or a power off state); virtual media management functions; and so forth.

The BMC 123 may, as part of its security plane, provide various security-related services for the computer platform 100, such as validating BMC firmware before the firmware is executed by the BMC 123. The security-related roles may include validating a UEFI image, after a power on or reset of the computer platform 100, before the firmware instructions contained in the UEFI image are executed by the main processing core(s) 110. The security-related roles may include monitoring software measurements (operating system kernel measurements) to detect security issues. The security-related roles may include updating firmware. Moreover, as part of its security-related roles, the BMC 123 may measure an UEFI boot block and extend a PCR state stored in a security processor 160 of the host 101 with the measured UEFI boot state. The BMC 123 may perform any of a number of other security-related roles for the computer platform 100.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The baseboard management controller may be mounted to another board that is connected to the motherboard. The fact that a baseboard management controller may be mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the management system 103 includes a secure memory, such as a non-volatile memory 180. In accordance with some implementations, the non-volatile memory 180 is external to the BMC 123, and the BMC 123 controls access to the non-volatile memory 180. In accordance with further implementations, the non-volatile memory 180 may be an internal memory of the BMC 123. The non-volatile memory 180 may store data representing the platform certificate 181, and the non-volatile memory 180 may store data representing an endorsement key (EK) certificate 195.

The management system 103 may include, in accordance with some implementations, a security processor 166 (or a "cryptographic security processor"). The EK certificate 195 that is stored in the non-volatile memory 180 may contain data (e.g., serial number, version number, manufacturer) that identifies the security processor 166. Moreover, the EK certificate 195 may contain data that represents a public EK 196 (e.g., a public part of an asymmetric cryptographic key, such as an RSA key) that corresponds to a private EK 170 (e.g., a private part of the asymmetric key, such as an RSA key) that is stored in a secure memory 168 (e.g., a non-volatile random access memory (NVRAM)) of the security processor 166. The EK certificate 195 may contain data that represents a signature 197 of the issuer of the EK certificate 195, and data representing a reference to the corresponding issuer 187 certificate. In accordance with further example implementations, data representing the EK certificate 195 may be stored in a memory of the security processor 166.

Figure 4:
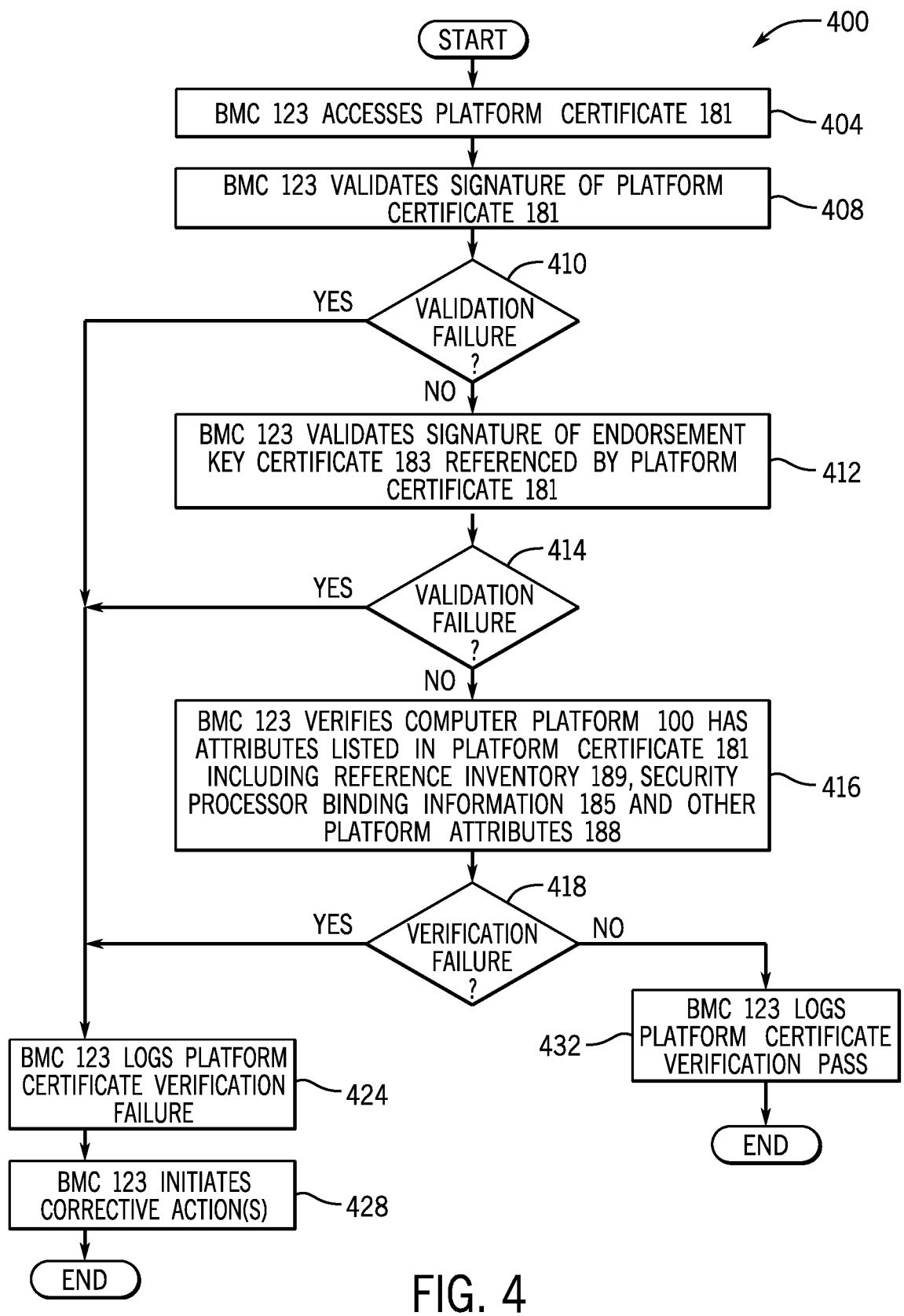
FIG. 4 is a flow diagram illustrating a process performed by the BMC to verify a platform certificate according to an example implementation.

The BMC 123, in accordance with example implementations, contains a platform certificate verification engine 124 that, responsive to a startup (e.g., power up or reset) of the computer platform 100, verifies the platform certificate 181, as further described herein in connection with FIG. 4. Verifying the platform certificate 181 may include the BMC 123 validating the platform certificate 181, validating the EK certificate 195 referenced by the platform certificate 181, and verifying attributes of the computer platform 100 to which the platform certificate 181 attests.

The platform certificate verification engine 124, in accordance with example implementations, verifies the platform certificate 181 in a pre-boot environment of the computer platform 100. The "pre-boot environment" refers to the stage or phase of the computer platform 100 startup before the local component(s) 130 of the operating system is loaded on the computer platform 100 and control is transferred to the operating system. Therefore, when verification of the platform certificate 181 fails, the platform certification verification engine 124 may initiate the appropriate corrective action(s) before the operating system loads to prevent a customers' infrastructure (e.g., network and other computer platforms) from being exposed to a compromised platform. As examples, such corrective actions may include powering down the computer platform 100, powering down the host 101, sending an alert message to the management server 190, preventing the computer platform 100 from "joining the fleet" (e.g., preventing the computer platform 100 from being connected to the network fabric 194, or isolating the computer platform 100 from its associated group of nodes 90, and so forth).

As depicted in FIG. 1, in accordance with example implementations, the BMC 123 may include a platform certificate generation engine 125. In accordance with some implementations, the platform certificate generation engine 125 may be used by the manufacturer of the computer platform 100, as described further herein in connection with FIG. 3, to provision the non-volatile memory 180 with the platform certificate 181 and the EK certificate 195.

In accordance with some implementations, the platform certificate verification engine 124 and the platform certificate generation engine 125 may perform at least some of their operations in a standby power mode of operation of the computer platform 100. In the standby power mode of operation, a power supply 175 of the computer platform 100 supplies power to supply voltage rails 176 that provide power to the components of the management system 103, but in the standby power mode of operation, the power supply 175 does not supply power to supply voltage rails 177 that provide power to the host 101. Accordingly, in accordance with some implementations, in the standby power mode of operation, the management system 103 is powered up, whereas the host 101 is powered down. This is contrast to for example, other power modes of operation of the computer platform 100 in which the management system 103 is powered up and components of the host 101 are powered up. In accordance with example implementations, the power supply 175 supplies power to the management system 103, and the BMC 123 may be remotely controlled by the management server 190 to control which (if any) of the host supply voltage rails 177 are powered.

The security processor 166 of the management system 103, in accordance with example implementations, is isolated from the host 101, i.e., the host 101 does not "see" the security processor 166. Instead, in accordance with example implementations, the host 101 has a corresponding host security processor 160, and the management system 103 has a corresponding management security processor 166. As such, in accordance with example implementations, the operating system of the computer platform 100 may access the security processor 160; the operating system does not have access to the security processor 166; and the operating system does not "see" the security processor 166. In accordance with some implementations, the BMC 123 is the sole owner of the security processor 166 for all environments of the computer platform 100, including the pre-boot environment (i.e., the environment after power-up or reset before the operating system loads) and the post-boot environment (i.e., the environment after the operating loads). In accordance with example implementations, the BMC 123 may gate, or control, access to the security processor 166 so that the BMC 123 may access the security processor 166, and the host 101 cannot access the security processor 166, whether by application programming interface (API) calls to the BMC 123 or otherwise.

In accordance with example implementations, the security processor 160,166 (where the notation "160,166" refers to either the security processor 160, the security processor 166, or both security processors 160 and 166) may be a Root of Trust for storing and a Root of Trust for reporting. In this context, a "Root of Trust device" or "RoT device," may be a device that behaves in an expected manner, as the RoT device's misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values.

The security processor 160,166, in accordance with example implementations, may be in the form of a semiconductor package (or "chip") that is mounted to a motherboard of the computer platform 100. A secure memory of the security processor 160,166 (such as the secure memory 168 of the security processor 166, as depicted in FIG. 1) may store platform secrets, such as cryptographic keys, passwords, sealed cryptographic keys, passwords, certificates, public keys, private keys, and so forth. Moreover, the secure memory may store data representing measurement digests. The security processor 160,166 may be designed according to industry standards to provide hardware-based, security functions while also resisting tampering and malicious software. In accordance with some implementations, the security processor 160,166 may be a TPM.

The security processor 160,166 may, in accordance with example implementations, perform trusted computing operations, such as the trusted computing operations that are described in the Trusted platform module Library Specification; Family 2.0, Level 00, Revision 01.59 (November 2019), published by the Trusted Computing Group (hereinafter called the "TPM 2.0 Specification"), In accordance with some implementations, the security processor 160,166 may perform one or multiple trusted computing operations that are not described in the TPM 2.0 Specification.

In accordance with some implementations, the security processor 160,166 may contain one or multiple processing cores (e.g., CPU cores) that execute instructions for the security processor 160,166 for purposes of causing the security processor 160,166 to perform its functions. In accordance with further example implementations, the security processor 160,166 may perform all or part of the functions using circuitry that does not execute machine-executable instructions, such as a field programmable gate array (FPGA), a complex programmable logic device (CPLD) or an application specific integrated circuit (ASIC).

In accordance with further implementations, the security processor 160,166 may be a virtual security processor that is formed by the execution of software or firmware. For example, in accordance with some implementations, the security processor 160 of the host 101 may be a virtual TPM (or "vTPM"), which may, for example, be provided by a hypervisor or other entity of the computer platform 100. As another example, in accordance with some implementations, the security processor 166 of the management system 103 may be a vTPM that is formed by the BMC 123 executing firmware instructions.

Among the other features of the computer platform 100, in accordance with example implementations, a bridge infrastructure of the computer platform 100 may include one or multiple bridges 118. The bridge(s) 118 establish communications between various links, or buses, of the computer platform 100. The bridge(s) 118 may be coupled to the main processing cores 110 and the BMC 123, as well as various other hardware components of the computer platform 100, such as storage drives; one or multiple NICs; one or multiple Universal Serial Bus (USB) devices; a video controller; and so forth. Moreover, as also depicted in FIG. 1, in accordance with example implementations, one or multiple PCIe device (s) 105 may be coupled to the bridge(s) 118 via corresponding PCIe buses, or links 111. In accordance with further implementations, the main processing cores 110 may form a hardware processor for the host 101. The main processing cores 110 may be coupled to the PCIe devices 105 through corresponding individual PCIe links 111. In accordance with yet further implementations, the I/O bridge(s) 106 and PCIe interfaces may be part of one or multiple CPU packages that contain the main processing cores 110.

In general, the memory devices that form the system memory 114 and the non-volatile memory 180, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

One or multiple main processing cores 110 of the computer platform 100 may execute machine-executable instructions 109 (e.g., instructions stored in the system memory 114), which cause the main processing core(s) 110 to form various firmware and software components of the host 101. For example, one or multiple main processing cores 110 may execute platform firmware instructions for purposes of forming the UEFI 137. The UEFI 137 may provide pre-boot environment services and runtime (or "post boot environment) services for the computer platform 100. Pre-boot services may include such services as initializing hardware components such as the main processing cores 110 and the system memory 114; loading and executing drivers in a certain order to initialize the computer platform 100; performing hardware and software security checks; loading a bootloader for the operating system; validating and loading drivers from I/O peripherals, such as the PCIe devices 105; and so forth. The "runtime services" refer to services provided by the UEFI 137 after control of the computer platform 100 has been passed to the operating system.

Figure 2:
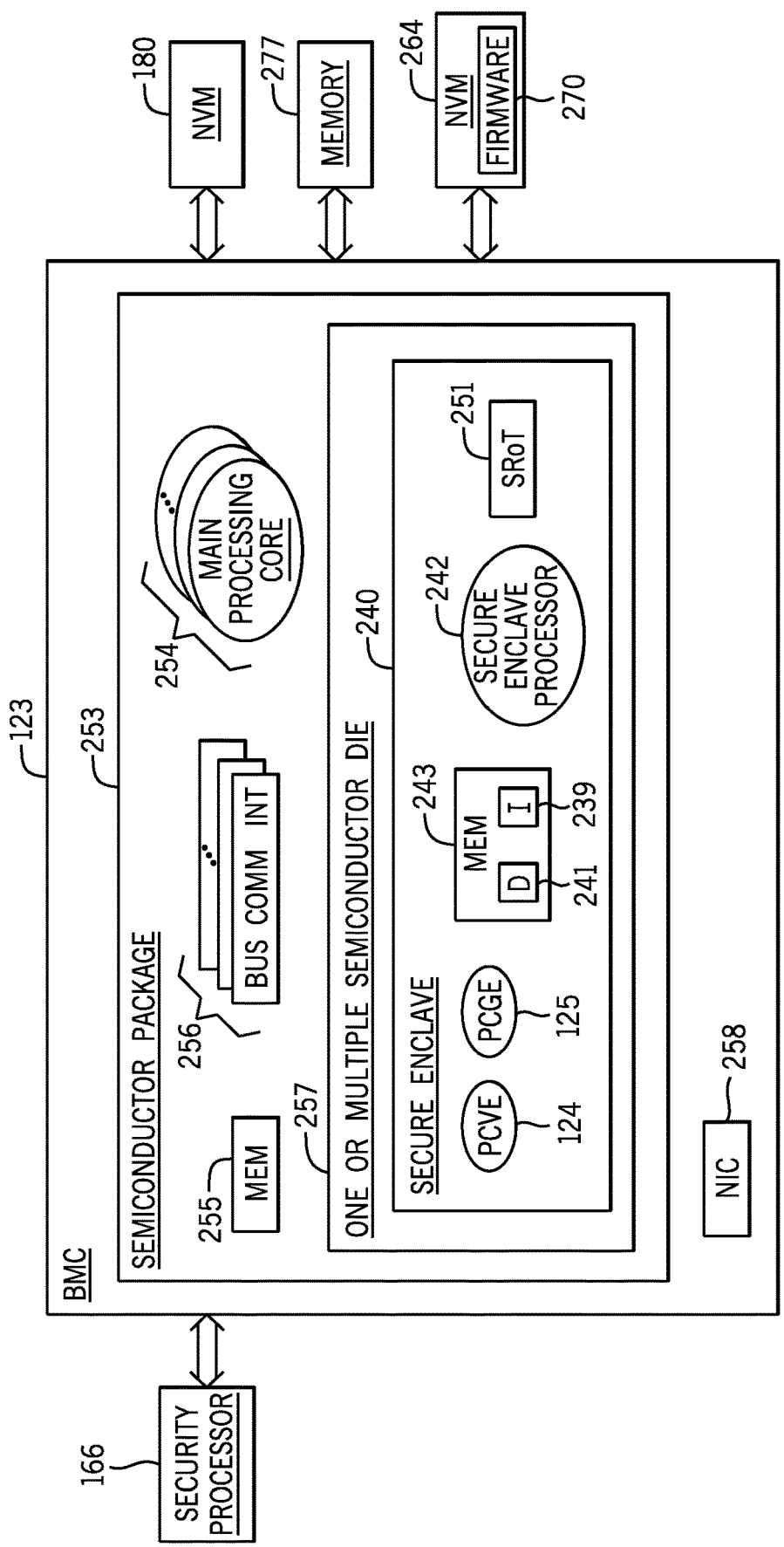
FIG. 2 is a schematic diagram of the BMC of FIG. 1 according to an example implementation.

Referring to FIG. 2 in conjunction with FIG. 1, In accordance with example implementations, the BMC 123 includes a hardware processor that includes one or multiple main processing cores 254 (e.g., CPU cores). The main processing core(s) 254 execute a firmware management stack for purposes of forming a management plane for the BMC 123. Through its management plane, the BMC 123 may provide management services for the host 101. In accordance with example implementations, the BMC 123 includes a secure enclave 240 that forms a security plane for the BMC 123. Through its security plane, the BMC 123 may provide security-related services for the host 101. In accordance with further example implementations, the BMC 123 may not include a secure enclave 240.

The secure enclave 240 may include a hardware secure enclave processor 242 (e.g., one or multiple processing cores, such as one or multiple CPU cores) and a memory 243 that stores machine-executable instructions 239 that may be executed by the secure enclave processor 242 to perform security-related services for the computer platform 100. In accordance with example implementations, the secure enclave processor 242 executes the machine-executable instructions 239 to form the platform certificate verification engine 124 and the platform certificate generation engine 125. Moreover, as also depicted in FIG. 2, in accordance with example implementations, the memory 243 may store data 241, which be related to the operations of the platform certificate verification engine 124 and the platform certificate generation engine 125. In this manner, the data 241 may be preliminary, intermediate or final stage data related to generating a platform certificate, validating a platform certificate, validating an EK certificate, determining an inventory of the computer platform 100, comparing an inventory of the computer platform 100 to a reference inventory provided by the platform certificate 181, verifying actual attributes of the computer platform 100 to the attributes to which the platform certificate 181 attests, and so forth.

In accordance with further example implementations, the platform certificate verification engine 124 and/or the platform certificate generation engine 125 may be provided by the BMC 123 as part of its management plane. For example, for these implementations, a hardware processor that is formed from one or multiple main processing cores 254 (e.g., one or multiple CPU cores) of the BMC 123 may execute machine-executable instructions for purposes forming the platform certificate verification engine 124 and/or the platform certificate generation engine 125. In accordance with further example implementations, the platform certificate verification engine 124 and/or the certificate generation engine 125 may be formed in whole or in part from dedicated hardware (e.g., an ASIC, a CPLD, a FPGA, and so forth) that does not execute machine-executable instructions.

In accordance with further example implementations, the platform certificate verification engine 124 and/or the platform certificate generation engine 125 may be part of the management server 190. For example, in accordance with some implementations, one or multiple hardware processors of the management server 190 may execute machine-readable instructions to form components of the platform certificate verification engine 124 and/or components of the platform certificate generation engine 125. These components may communicate with a management controller (e.g., a BMC) of the computer platform 100 for purposes of verifying the platform certificate 181 and/or provisioning the non-volatile memory 180 with the platform certificate 181 and the EK certificate 195.

In accordance with some implementations, components of the BMC 123, such as the main processing core(s) 254, one or multiple bus communication interfaces 256, a memory 255, a NIC 258 (which may be coupled to the network fabric 194) and the secure enclave 240, may be disposed inside a semiconductor package 253 (or "chip"). The semiconductor package 253 may be any of numerous types of packages, such as a surface mount package, a through-hole package, a ball-grid array package, a small outline package, a chipscale package, and so forth. Moreover, depending on the particular implementation, the components of the secure enclave 240 may be fabricated in one or multiple die 257 of the semiconductor package 253, and the management plane components of the BMC 123, such as the main processing core(s) 254, the bus communication interface(s), the memory 255 and the NIC 258, may be fabricated in one or multiple other die of the semiconductor package 253.

In accordance with example implementations, the BMC's secure enclave 240 is a subsystem of the BMC 123 for which access into and out of the subsystem is tightly controlled. In accordance with example implementations, the secure enclave 240 performs cryptographic functions for the computer platform 100 and is fully disposed inside a cryptographic boundary. A "cryptographic boundary" in this context refers to a continuous boundary, or perimeter, which contains the logical and physical components of a cryptographic subsystem, such as BMC components that form the secure enclave 240.

In accordance with example implementations, the secure enclave 240 includes a hardware, or silicon, Root of Trust engine 251 (herein called an "SRoT engine 251") that provides security features for the BMC 123. More specifically, in accordance with example implementations, the secure enclave 240 stores an immutable fingerprint, which is used by the SRoT engine 251 to validate portions of firmware 270 for the computer platform 100, which may be stored in a non-volatile memory 264. In accordance with example implementations, the firmware 270 may include machine-executable instructions that, when they pass validation, are stored in the memory 243 of the secure enclave 240 and executed by the secure enclave processor 242; machine-executable instructions corresponding to the BMC's management stack firmware image, which, when they pass validation, are executed by the main processing core(s) 254 of the BMC 123; machine-executable instructions of a UEFI firmware image that corresponds to the UEFI 137; and so forth.

In accordance with example implementations, the BMC 123 places holds on the main processing core(s) 254 and the secure enclave processor 242 when the BMC 123 is first powered on or reset. Responsive to the power on or reset, the SRoT engine 251 validates and then loads an initial portion of the firmware 270 into the memory 243 of the secure enclave 240 so that this firmware portion is now trusted. The BMC 123 then releases the hold on the secure enclave processor 242 to allow the secure enclave processor 242 to boot and execute the loaded firmware instructions. By executing the firmware instructions, the secure enclave processor 242 may then validate the firmware corresponding to the BMC's management firmware stack and after validation, load the firmware into the memory 255 of the BMC 123. The instructions of the management firmware stack may then be executed by the main processing core(s) 254 (when released from reset), which causes the main processing core(s) 254 to load additional portions of the firmware 270 and place the loaded portions into a memory 277. Access to the memory 277 may involve additional training and initialization steps (e.g., training and initialization steps set forth by the DDR specification). Those instructions may be executed from the validated portion of the BMC's firmware management stack in the memory 255. In accordance with example implementations, the secure enclave 240 may lock the memory 255 to prevent modification or tampering with the validated portion(s) stored in the memory 255. Therefore, in accordance with example implementations, the chain of trust may be extended from the BMC's SRoT to the firmware management stack that is executed by the BMC's main processing core(s) 254.

In accordance with example implementations, the BMC 123 is constructed to prevent a given domain or entity of the BMC 123 from powering up or coming out of reset until the secure enclave 240 validates the domain/entity. Moreover, in accordance with example implementations, the BMC 123 may prevent components of the BMC 123 from accessing resources of the BMC 123 and resources of the computer platform 100 until the secure enclave 240 approves/validates the resources. The BMC 123 may perform bus filtering and monitoring (e.g., bus filtering and monitoring for an SPI bus, a system management bus (SMB), an Inter-Intergrade Component ($I^2C$) bus, an Improved $I^2C$ ($I^3C$) bus, and so forth, to prevent unwanted access to bus devices.

The bus communication interfaces 256 of the BMC 123, in accordance with example implementations, may include one or multiple interfaces to buses that are coupled to the host 101; one or multiple interfaces to the bridge(s) 118; and interfaces to the non-volatile memory 180, the memory 277 and the non-volatile memory 264. In accordance with some implementations, a particular bus communication interface 256 may couple the BMC 123 to a bus (e.g., a Serial Peripheral Interface (SPI) bus or a Low Pin Count (LPC) bus) that is coupled to the security processor 166. In accordance with some implementations, the BMC 123 and the security processor 166 may be the only bus devices that are coupled to this bus, thereby establishing the BMC 123 as a gatekeeper to control access to the security processor 166.

The BMC 123 may have an architecture different from the architecture that is depicted in FIG. 2 and described herein, in accordance with further implementations.

Figure 3:
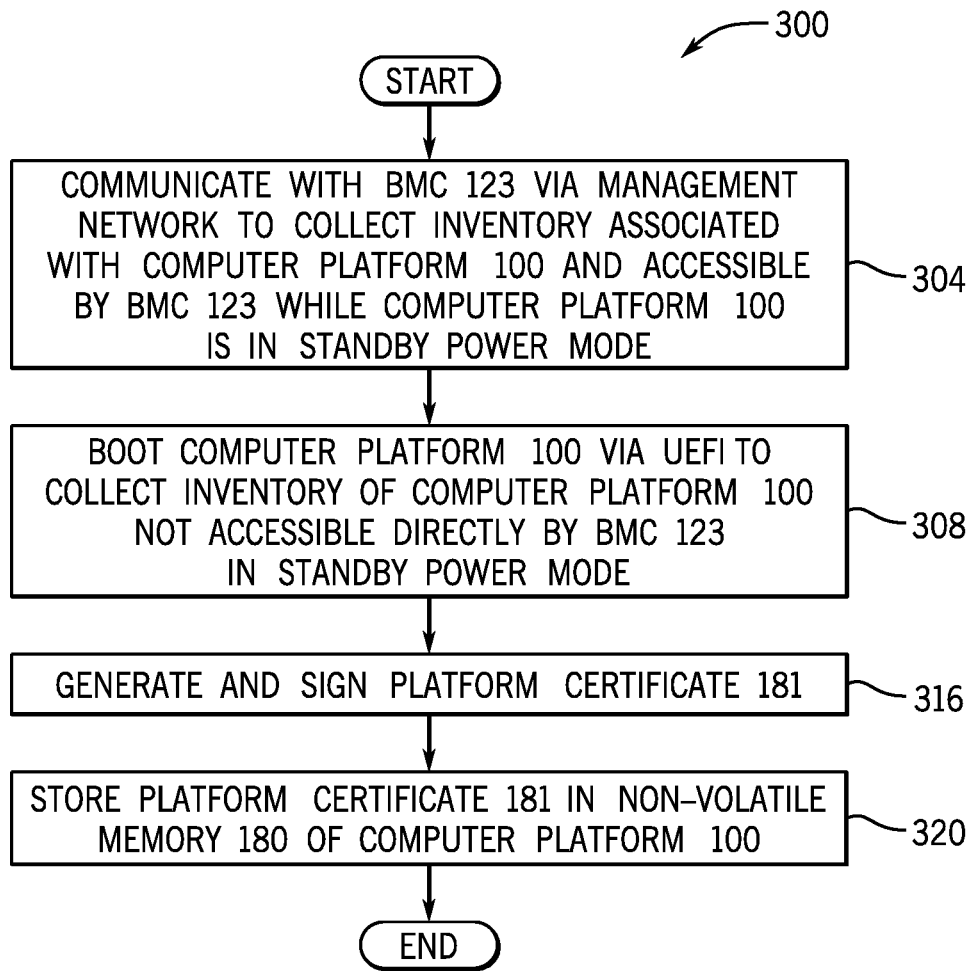
FIG. 3 is flow diagram illustrating a process performed by the BMC to create a platform certificate according to an example implementation.

FIG. 3 depicts a process 300 that may be performed by the BMC 123 using its platform certificate generation engine 125, in accordance with example implementations. Referring to FIG. 3 in conjunction with FIG. 1, in accordance with example implementations, the process 300 includes collecting, or acquiring, an inventory of the computer platform 100. This collection of the inventory is used to form a corresponding reference inventory 189 of the platform certificate 181, in accordance with example implementations. Collecting the inventory may, in accordance with example implementations, involve using the BMC 123 to directly collect a first part of the reference inventory 189 while the computer platform 100 is in the standby mode of operation (e.g., the mode of operation in which the host 101 is powered down). More specifically, pursuant to block 304, the process includes the management server 190 communicating with the BMC 123 via the management network to collect an inventory that is associated with the computer platform 100 and is accessible by the BMC 123 while the computer platform 100 is in the standby power mode of operation. The BMC 123 may not be able to directly collect all of the reference inventory 189, in accordance with example implementations, while the computer platform 100 is in the standby mode of operation. Therefore, pursuant to block 308, in accordance with example implementations, the computer platform 100 is controlled such that the computer platform 100 boots via UEFI (without booting the host operating system) to collect the part of the reference inventory 189 that is not accessible directly by the BMC 123 in the standby power mode of operation.

Pursuant to block 316, the process 300 includes generating and signing the platform certificate 181. In accordance with some implementations, generating the platform certificate 181 includes generating data for the platform certificate 181 that represents the reference inventory 189, generating data for the platform certificate 181 that represents an issuer 187 of the platform certificate 181, generating data that represents security processor binding information 185, and generating data that represents other platform attributes 188. In accordance with example implementations, the security processor binding information 185 is a reference to the EK certificate 195. Because the EK certificate 195 is tied to a specific security processor 166, the platform certificate 181, due to the inclusion of the security processor binding information 185, is bound to the security processor 166. The other platform attributes 188 may include various other identification and configuration element attributes of the computer platform 100, such as, as examples, a platform version number, a platform model number, a platform serial number, a specification associated with the computer platform 100, and so forth.

Pursuant to block 316, the BMC 123 signs the data of the platform certificate 181. As an example, in accordance with some implementations, signing the data may include the BMC 123 determining a hash value based on a private key associated with the issuer 187 and the non-signature field content of the platform certificate 181. This hash, in turn, forms a corresponding signature 184 for the platform certificate 181. Therefore, as described further herein in connection with FIG. 4, the platform certificate 181 may be validated based on the signature 184 of the platform certificate 181 and the corresponding non-signature field content of the platform certificate 181. The signature 184 may be created by a corresponding PKI and an associated certificate chain of trust. The issuer of the platform certificate 181 has a corresponding public key, which may be used to hash the content of the platform certificate 181, so that if the hash value is the same as the signature 184, then the platform certificate 181 passes validation. The content of the platform certificate 181 may then be evaluated, as further described herein, for purposes of forming the second part of the platform certificate validation. Pursuant to block 320 of the process 300, the platform certificate 181 may be stored in the non-volatile memory 180 of the computer platform 100.

In the context used herein, a "hash" (also called a "hash value" herein) is produced by the application of a cryptographic hash function to a value (e.g., an input, such as an image). A "cryptographic hash function" may be a function that is provided through the execution of machine-executable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

FIG. 4 depicts a process 400 performed by the BMC 123 using the platform certificate verification engine 124 to verify a platform certificate 181 according to an example implementation. In accordance with example implementations, the BMC 123 may perform the process 400 responsive to a startup of the computer platform 100 or responsive to communications from the management server 190. Referring to FIG. 4 in conjunction with FIG. 1, pursuant to block 404 of the process 400, the BMC 123 accesses the platform certificate 181 that is stored in the non-volatile memory 180. The BMC 123 then validates (block 408) the platform certificate 181. This validation may include the BMC 123 validating the signature 184 of the platform certificate 181. If, pursuant to decision block 410, the platform certificate 181 does not pass validation, then, pursuant to block 424, the BMC 123 logs the failure and initiates (block 428) the appropriate corrective action(s).

If the platform certificate passes validation, then, pursuant to block 412, the BMC 123 validates the EK certificate 195, which is referenced by the platform certificate 181. In accordance with some implementations, the validation of the EK certificate 195 involves validating a signature 197 of the EK certificate 195. Pursuant to decision block 414, if the validation of the EK certificate 195 fails, then the failure is logged 424 and the BMC 123 initiates the appropriate corrective action(s), pursuant to block 428.

Pursuant to block 416, in accordance with example implementations, the BMC 123 next verifies that the computer platform 100 has the attributes that are attested to by the platform certificate 181. For example, block 416 may include the BMC 123 comparing the reference inventory 189 to an actual inventory of the computer platform 100. Moreover, in accordance with example implementations, block 416 may include the BMC 123 verifying other attested attributes. For example, this may entail the BMC 123 verifying platform identification attributes, verifying a platform specification attribute, verifying specific configuration elements, and so forth. Moreover, block 416 may include, in accordance with example implementations, the BMC 123 verifying that the security processor binding information 185 accurately references the EK certificate 195. If, pursuant to decision block 418, the verification of the platform certificate 181 fails, then the platform certificate verification failure is logged (block 424), and the BMC 123 initiates the appropriate corrective action(s) pursuant to block 428. Otherwise, if the verification of the platform certificate 181 passes, then, in accordance with example implementations, the BMC 123 logs (block 432) the platform certificate verification pass.

Figure 5:
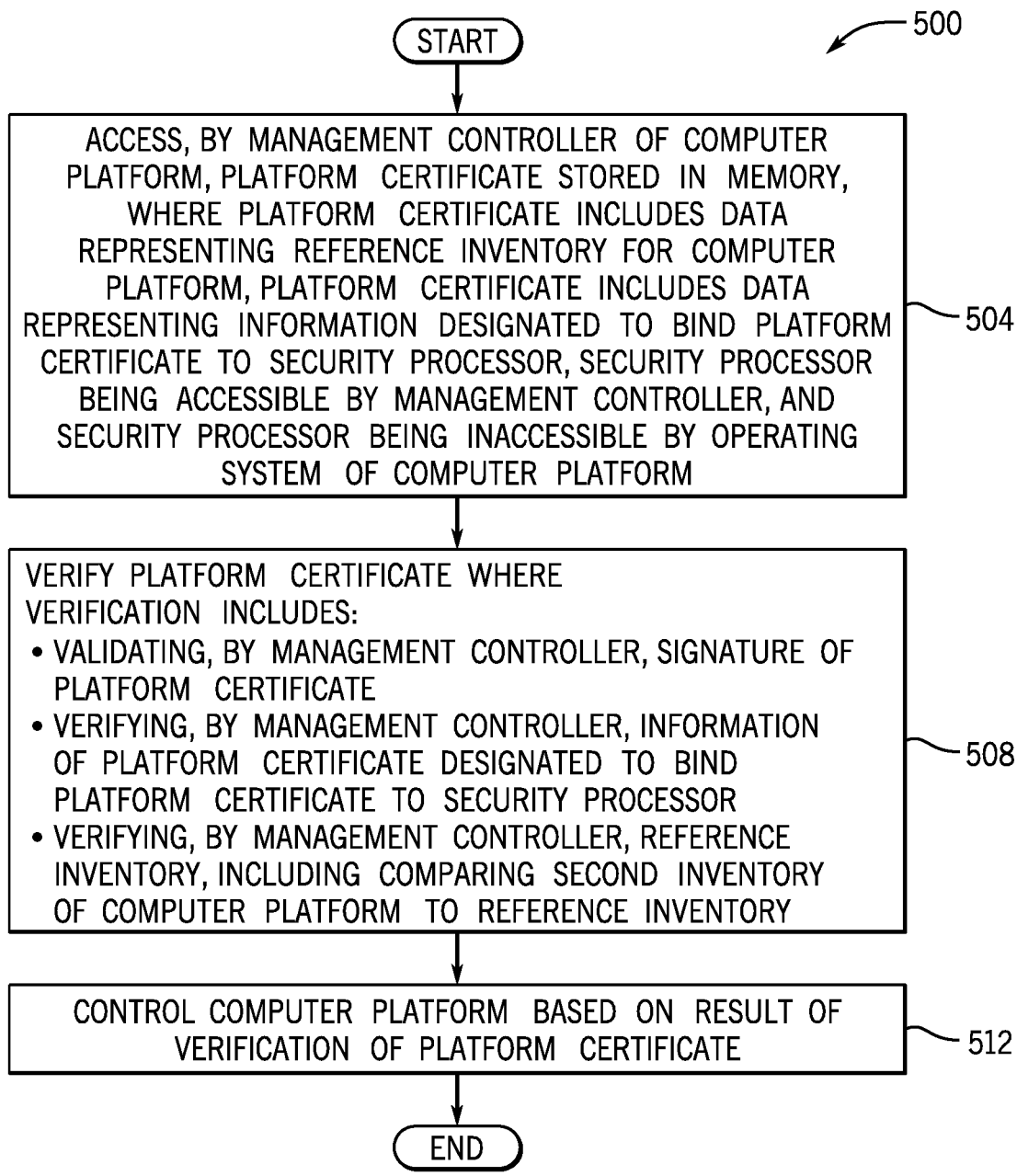
FIG. 5 is a flow diagram depicting a process performed by a management controller to verify a platform certificate according to an example implementation.

Referring to FIG. 5, in accordance with example implementations, a process 500 includes accessing (block 504) by a management controller of a computer platform, a platform certificate that is stored in a secure memory. The platform certificate includes data representing a reference inventory for the computer platform. The platform certificate includes data representing information designated to bind the platform certificate to a security processor. The security processor is accessible by the management controller. The security processor is inaccessible by an operating system of the computer platform. The process 500 includes verifying (block 508) the platform certificate. Verifying the platform certificate includes validating, by the management controller, a signature of the platform certificate; and validating, by the management controller, the information that is designated to bind the platform certificate to the security processor. Verifying the platform certificate includes comparing, by the management controller, a second inventory of the computer platform to the reference inventory. The process 500 includes controlling (block 512) the computer platform based on a result of the verification of the platform certificate.

Figure 6:
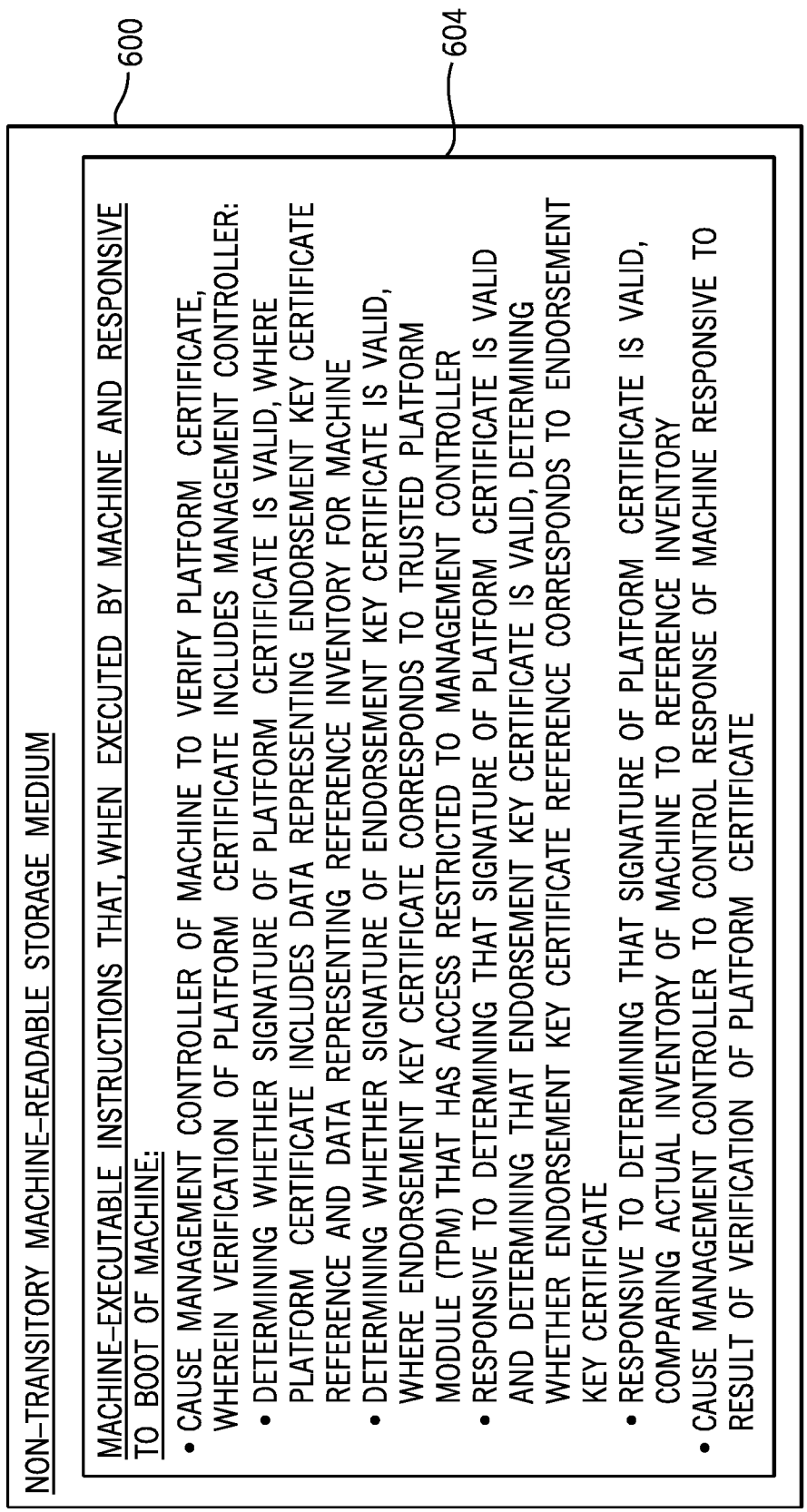
FIG. 6 is an illustration of machine-executable instructions stored on a machine-executable non-transitory storage medium that, when executed by a machine, cause a management controller to verify a platform certificate according to an example implementation.

Referring to FIG. 6, in accordance with example implementations, a non-transitory storage medium 600 stores machine-executable instructions 604. The instructions 604, when executed by the machine and responsive to a boot of the machine, cause a management controller of the machine to verify a platform certificate. Verifying the platform certificate includes the management controller determining whether a signature of the platform certificate is valid. The platform certificate includes data representing an endorsement key certificate reference and data representing a reference inventory for the machine. Verifying the platform certificate includes the management controller determining whether a signature of an endorsement key certificate is valid. The endorsement key certificate corresponds to a trusted platform module (TPM) that has an access restricted to the management controller. Verifying the platform certificate includes the management controller, responsive to determining that the signature of the platform certificate is valid and determining that the signature of the endorsement key certificate is valid, determining whether the endorsement key certificate reference corresponds to the endorsement key certificate. Verifying the platform certificate includes the management controller, responsive to determining that the signature of the platform certificate is valid, comparing an actual inventory of the machine to the reference inventory. The instructions 604, when executed by the machine and responsive to the boot of the machine, further cause the management controller to control a response of the machine responsive to a result of the verification of the platform certificate.

Figure 7:
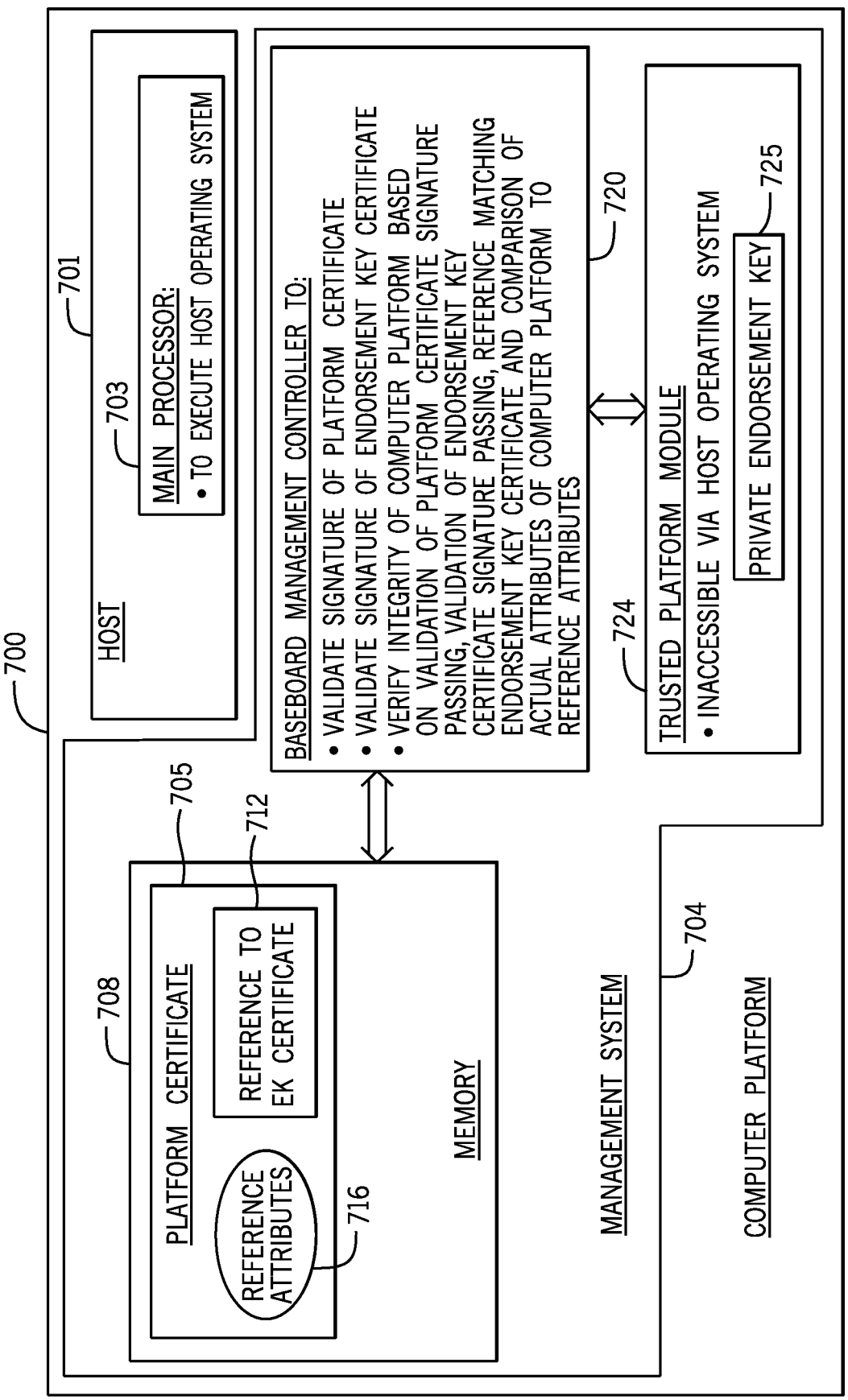
FIG. 7 is a schematic diagram of a computer platform that includes a BMC to verify a platform certificate according to an example implementation.

Referring to FIG. 7, in accordance with example implementations, a computer platform 700 that includes a host 701 and a management system 704. The host includes a trusted platform module 702 and a main processor 703 to execute a host operating system. The management system 704 includes a trusted platform module 724, a memory 708, and a baseboard management controller 720. The trusted platform module 724 is inaccessible by the operating system. The trusted platform module 724 stores a private endorsement key 725. The memory 708 stores a platform certificate 705. The platform certificate 705 includes data representing reference attributes 716 for the computer platform 700 and data 712 referencing the endorsement key certificate 718. The endorsement key certificate includes a public endorsement key that corresponds to a private endorsement key. The baseboard management controller 720 is coupled to the memory 708 to validate a signature of the platform certificate 705 and validate a signature of the endorsement key certificate. The baseboard management controller 720 to verify an integrity of the computer platform 700 based on validation of the platform certificate signature passing, validation of the endorsement key certificate signature passing, and a comparison of actual attributes of the computer platform to the reference attributes 716.

In accordance with example implementations, acquiring the second inventory includes acquiring, by the management controller, at least part of the second inventory in a standby power mode of the computer platform in which the management controller receives power and components associated with a host of the computer platform are unpowered. A particular advantage is that a platform identity, a platform inventory and a supply chain integrity may be verified without exposing an operating system to a compromised computer platform.

In accordance with example implementations, acquiring the second inventory further includes providing power to the host and executing, by the host, firmware to acquire at least part of the second inventory. A particular advantage is that a platform identity, a platform inventory and a supply chain integrity may be verified without exposing an operating system to a compromised computer platform.

In accordance with example implementations, executing the firmware includes executing Unified Extensible Firmware Interface (UEFI) instructions. A particular advantage is that a platform identity, a platform inventory and a supply chain integrity may be verified without exposing an operating system to a compromised computer platform.

In accordance with example implementations, the management controller performs the verification of the platform certificate responsive to a startup of the computer platform. A particular advantage is that a platform identity, a platform inventory and a supply chain integrity may be verified without exposing an operating system to a compromised computer platform.

In accordance with example implementations, the computer platform corresponds to a node of a plurality of nodes of a multiple node computing system. The operating system includes a local component of a multi-node operating system. A particular advantage is that a per node platform certificate may be bound to a security processor of the node allowing different multi-nodal use cases.

In accordance with example implementations, controlling the computer platform includes controlling the computer platform based on a result of the verification of the platform certificate. A particular advantage is that a platform identity, a platform inventory and a supply chain integrity may be verified without exposing an operating system to a compromised computer platform.

In accordance to example implementations, controlling the computer platform includes controlling whether the operating system boots on the computer platform. A particular advantage is that a platform identity, a platform inventory and a supply chain integrity may be verified without exposing an operating system to a compromised computer platform.

In accordance with example implementations, controlling the computer platform includes controlling whether the computer platform is isolated from the computer network based on a result of the comparison of the second inventory to the reference inventory. A particular advantage is that a platform identity, a platform inventory and a supply chain integrity may be verified without exposing an operating system to a compromised computer platform.

In accordance with example implementations, validating the signature of the platform certificate includes validating the signature based on a content of the platform certificate. A particular advantage is that a platform identity, a platform inventory and a supply chain integrity may be verified without exposing an operating system to a compromised computer platform.

In accordance with example implementations, the information that is designated to bind the platform certificate to the security processor includes an endorsement key certificate. A particular advantage is that a platform identity, a platform inventory and a supply chain integrity may be verified without exposing an operating system to a compromised computer platform.

In accordance with example implementations, the management controller validates a signature of the endorsement key certificate based on a content of the endorsement key certificate. A particular advantage is that a platform identity, a platform inventory and a supply chain integrity may be verified without exposing an operating system to a compromised computer platform.

In accordance with example implementations, the management controller includes a baseboard management controller, and the security processor includes a trusted platform module (TPM). In accordance with example implementations, the baseboard management controller controls access to the TPM. A particular advantage is that a platform identity, a platform inventory and a supply chain integrity may be verified without exposing an operating system to a compromised computer platform.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   accessing, by a management controller of a computer platform, a platform certificate stored in a secure memory, wherein the platform certificate comprises data representing a reference inventory for the computer platform, the platform certificate comprises data representing information designated to bind the platform certificate to a security processor, the security processor being accessible by the management controller, and the security processor being inaccessible by an operating system of the computer platform;
   verifying the platform certificate, wherein the verifying comprises:
   validating, by the management controller, a signature of the platform certificate;
   verifying, by the management controller, the information designated to bind the platform certificate to the security processor; and
   comparing, by the management controller, a second inventory of the computer platform to the reference inventory; and
   controlling the computer platform based on a result of the verification of the platform certificate.

2. The method of claim 1, wherein acquiring the second inventory comprises acquiring, by the management controller, at least part of the second inventory in a standby power mode of the computer platform in which the management controller receives power and components associated with a host of the computer platform are unpowered.

3. The method of claim 1, wherein acquiring the second inventory further comprises providing power to the host and executing, by the host, firmware to acquire at least part of the second inventory.

4. The method of claim 3, wherein executing the firmware comprises executing Unified Extensible Firmware Interface (UEFI) instructions.

5. The method of claim 1, further comprising performing, by the management controller, the verification of the platform certificate responsive to a startup of the computer platform.

6. The method of claim 1, wherein the computer platform corresponds to a node of a plurality of nodes of a multiple node computing system, the operating system comprises a local component of a multi-node operating system.

7. The method of claim 1, wherein controlling the computer platform comprises controlling the computer platform based on a result of the verifying the platform certificate.

8. The method of claim 1, wherein controlling the computer platform comprises controlling whether the operating system boots on the computer platform.

9. The method of claim 1, wherein controlling the computer platform comprises controlling whether the computer platform is isolated from a computer network based on the result of the comparison of the second inventory to the reference inventory.

10. The method of claim 1, wherein validating the signature of the platform certificate comprises validating the platform certificate based on a content of the platform certificate.

11. The method of claim 1, wherein the information designated to bind the platform certificate to the security processor comprises an endorsement key certificate.

12. The method of claim 11, further comprising:
validating, by the management controller, a signature of the endorsement key certificate based on a content of the endorsement key certificate.

13. The method of claim 11, wherein the management controller comprises a baseboard management controller, the security processor comprises a trusted platform module (TPM), and the method further comprises the baseboard management controller controlling access to the TPM.

14. The method of claim 1, further comprising:
communicating with the management controller responsive to the computer platform being in a standby power mode to acquire data representing at least part of the reference inventory, wherein the management controller is powered on during the standby power mode and main processor of the computer platform is unpowered during the standby power mode, and the main processor executes the operating system;
responsive to acquiring data representing at least part of the reference inventory, generating the platform certificate; and
causing the management controller to store the platform certificate in the secure memory.

15. A computer platform comprising:
a host comprising a main processor, wherein the main processor to execute an operating system; and
a management system comprising:
a trusted platform module inaccessible by the operating system, wherein the second trusted platform module to store a private endorsement key;
a memory to store a platform certificate, wherein the platform certificate comprises data representing reference attributes for the computer platform and data referencing an endorsement key certificate, and the endorsement key certificate comprises a public endorsement key corresponding to the private endorsement key; and
a baseboard management controller coupled to the memory to:
validate a signature of the platform certificate;
validate a signature of the endorsement key certificate; and
verify an integrity of the computer platform based on validation of the signature of the platform certificate passing, validation of the signature of the endorsement key certificate passing, and a comparison of actual attributes of the computer platform to the reference attributes.

16. The computer platform of claim 15, wherein the baseboard management controller validates the signature of the platform certificate, validates the signature of the endorsement key certificate and verifies the integrity of the computer platform responsive to a boot of the computer platform.

17. The computer platform of claim 15, wherein:
the reference attributes comprise a reference inventory for the computer platform;
the baseboard management controller to, in a standby power mode of the computer platform in which the host is unpowered, determine a first part of a second inventory of the computer platform;
the main processor to execute firmware to determine a second part of the second inventory; and
the baseboard management controller to compare the second inventory to the reference inventory, and initiate a corrective action response to a result of the comparison.

* * * * *